INVENTOR:
JAMES C. ADAIR
BY:
HIS ATTORNEY

United States Patent Office 3,474,879
Patented Oct. 28, 1969

3,474,879
ACOUSTIC METHOD FOR MAPPING THE SURFACE CHARACTERISTICS OF A BOREHOLE
James C. Adair, Bellaire, Tex., assignor to Shell Oil Company, New York, N.Y., a corporation of Delaware
Filed Apr. 25, 1968, Ser. No. 724,182
Int. Cl. E21b 47/022
U.S. Cl. 181—.5                                           1 Claim

ABSTRACT OF THE DISCLOSURE

A method for inspecting the inner wall of a tubular opening by means of pulsed beams of acoustic waves. The beams are focused to travel radially and to contact the wall at a small angle. The waves in each beam sweep along a longitudinal strip of the wall and some waves are reflected back to a point near the axis of the pulsed beam. The reflected waves are received and visible displays are made of the amplitudes with time at which waves are received from the longitudinal strips along the wall.

BACKGROUND OF THE INVENTION

Field of the invention

This invention relates to an acoustic method for mapping the inner wall of a tubular opening and more particularly to an acoustic method that will accurately map the entire wall of a tubular opening.

DESCRIPTION OF THE PRIOR ART

Many procedures have been developed in the past to map the wall of a borehole that penetrates various earth formations. Normally these procedures have utilized various photographic means for photographing the wall of a borehole and transmitting the picture image to the surface. Also, various systems have been developed that use deformable materials for obtaining an impression of the wall of a borehole. In addition to the above methods that attempt to obtain a pictorial representation of the physical characteristics of the borehole, systems using various physical stresses, as, for example, acoustical energy, resistivity and conductivity, have been used to log a borehole to obtain responses that indicate the characteristics of various formations penetrated by the borehole.

Of the above methods, those that obtain a pictorial representation of the borehole wall have several limitations. For example, those that attempt to photograph the borehole wall or scan the borehole wall with a television camera are limited to boreholes containing a relatively clear liquid. This limitation means that such systems are limited almost exclusively to boreholes that are drilled as water wells or are capable of being filled with water. Thus, such systems are of little use in surveying boreholes that are normally drilled as petroleum producing wells. Petroleum wells are normally drilled using a drilling mud that is weighted with various materials to prevent an inflow of fluid from fluid containing formations. While in some isolated cases it is possible to replace the drilling mud with water and still control the well, such cases are extremely rare.

Systems that depend upon the use of a deformable material to take a physical impression of the formation surface are limited due to the inability to survey any great length of borehole.

Systems that use various logging techniques such as acoustical or resistivity techniques for mapping a borehole wall have in the past provided only sketchy and inaccurate presentations of the formations. For example, one system utilizes a relatively small number of sensing elements and then plots the response of each element separately, thereby providing only a limited amount of information concerning the characteristics of the borehole wall.

In summary, some prior art systems require coring while drilling which is expensive and can only be done while drilling. Remote television cameras require a clear, transparent medium in the well and are generally too temperature sensitive for general use. Such methods are inadequate for full condition evaluation. The spot type of acoustic reflection technique does not permit observation of the same wall spot from different angles as the tool progresses up the borehole.

SUMMARY OF THE INVENTION

It is an object of this invention to provide an acoustic logging method which will operate in opaque borehole drilling fluids at borehole temperatures to accurately map a borehole wall with high resolution in a comparatively short time.

It is a further object of this invention to provide an acoustic method for logging a borehole wall which uses only one medium between the acoustic transducer and the surface to be measured, thereby maintaining essentially constant acoustic constants along the length of the wall.

It is a still further object of this invention to measure only acoustic waves that are reflected from the wall surface of a borehole, thereby providing a sharper delineation of features than a penetrating-type of acoustic velocity measurement.

It is still another object to cover more area of the borehole wall per acoustic pulse compared to present acoustic methods, thus permitting a better coverage of the wall area for a given logging speed.

The system of this invention utilizes acoustic energy for mapping the subterranean formations adjacent a borehole containing a borehole fluid. The borehole may also be any cavity having approximately a cylindrical shape such as the inside of a pipe or the hole resulting from drilling in the earth's crust.

In accordance with this invention, a series of pulsed beams of acoustic waves are generated within an elongated tubular opening. The beams are each focused to travel along a generally radial path from near the center of the opening to a low angle contact with the wall, so that the waves in each beam sweep along a relatively narrow strip paralleling the length of the wall. Each beam is focused to contact a portion of the wall that is displaced laterally from a portion contacted by a preceding beam. Acoustic energy is received at points that are near the center of the opening and the axis of each beam. A record is made of the amplitude with time of the acoustic energy that is reflected back to each reception point during the sweeping of each strip along the wall. Visible indications of the amplitudes with time records are displayed in a spatial distribution corresponding to the distribution of the beam-swept strips along the wall of the opening.

Where the wall of the opening is relatively smooth and straight, nominal and uniform amounts of energy are reflected to the receiving location from each portion of each strip that is swept by the waves of a pulsed beam. In a variable density type of display, this produces a gray zone having a length proportional to that of the acoustically illuminated strip along the wall of the opening. A cavern in the wall of the opening produces a substantially white spot or blank area in such a recording since, during the recording of a time history of the received acoustic energy, no returns are received from the waves in the pulsed beam that encounter a blank section at the mouth of the cavern. The bottom of such a cavern, a fracture, or a rock interface, produces a dense spot on such a record, since it provides a reflector that is oriented to reflect a relatively large proportion of acoustic energy to the receiving location.

In preferred embodiments, means for measuring the compass bearing and/or inclination of the tool are used to measure compass bearings and/or angles to the vertical of the directions along which the pulsed beams of acoustic waves are focused. Such embodiments provide means for indicating the direction and indication of features such as fractures, inclined washed-out zones, etc.

This invention is particularly useful for inspecting the inner wall of a borehole or a material disposed in the borehole of a well. It tends to represent smooth portions of borehole walls as gray zones that produce only background reflected energy, to represent interiors of washed out or cavernous portions as gaps from which no energy is reflected, and to represent fractures or ledges below cavernous portions as localized strongly reflecting areas of the walls.

DESCRIPTION OF THE PREFERRED EMBODIMENT

Figures 1, 2, 3:
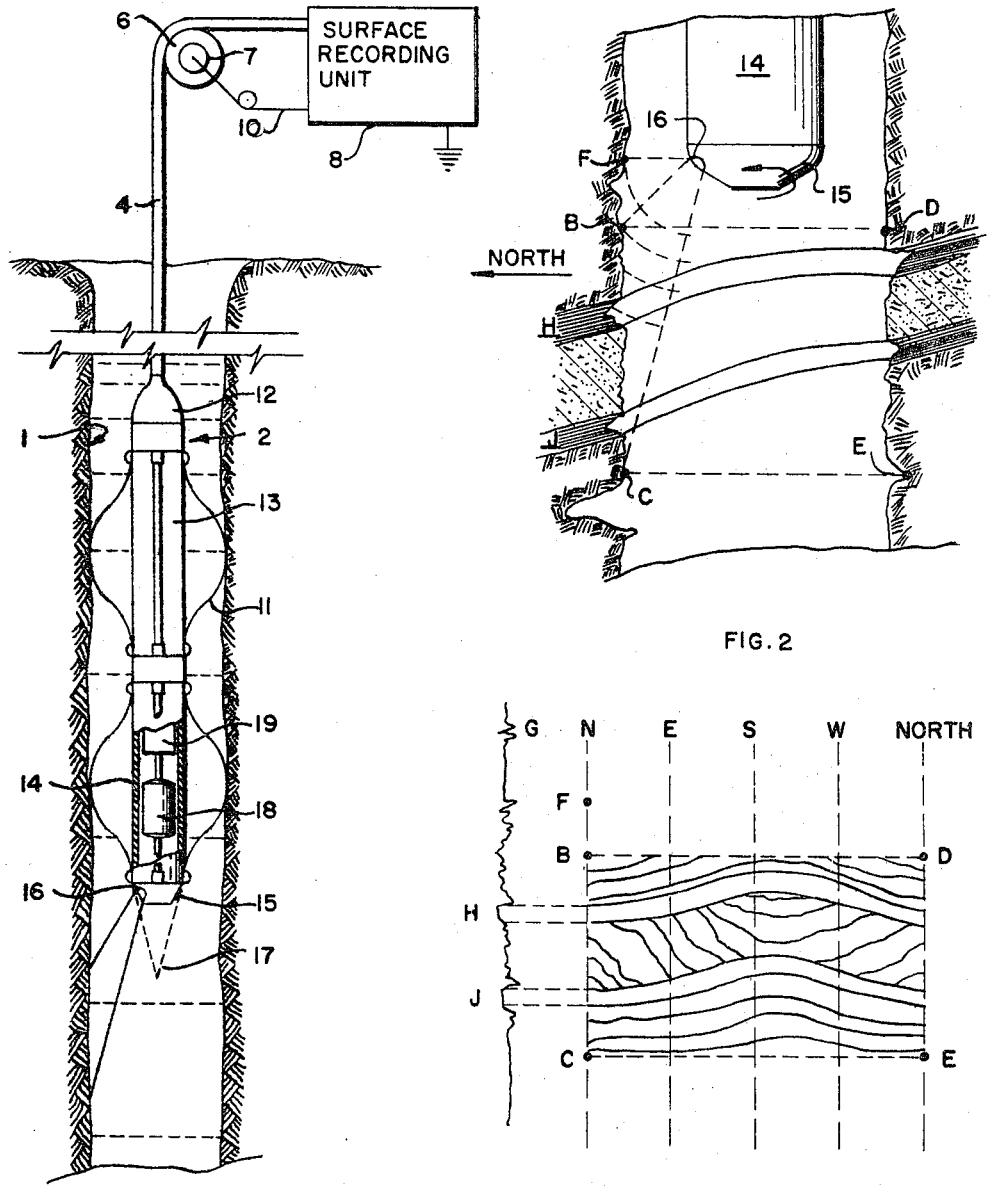
FIGURE 1 is an elevation view of a cross-section of a borehole showing apparatus for carrying out applicant's invention disposed therein.
FIGURE 2 is a detailed elevation view of the borehole cross-section of FIGURE 1 with the acoustic scanner of the apparatus in operating position.
FIGURE 3 is a graphical recording of the full section of the borehole of FIGURE 1.

Referring to FIGURE 1, the apparatus of the present invention comprises an elongated tubular housing 2 adapted to be lowered into a borehole at the end of a cable 4, preferably a coaxial or multi-conductor insulated cable. The cable 4 passes over a suitably powered and calibrated reel 6 which may be coupled or associated with a Selsyn generator 7. The cable 4 is electrically connected to a surface recording unit 8 comprising the desired amplifying, synchronizing and indicating or recording elements. Cable 4 is also provided with sufficient mechanical strength to permit the lowering and raising of the housing 2 within the borehole 1.

The reel 6, or preferably the output of the Selsyn generator 7, is electrically connected to the unit 8 through a conductor 10 in order that the depth or level of the housing 2 may be measured or recorded at any instant together with the desired indications from the housing 2, as will appear hereinbelow.

The housing 2 consists of a plurality of tubular members, preferably held in fluid-tight screw-threaded engagement with each other. The housing 2 is provided with centering devices 11 to maintain the housing 2 centered with the borehole 1. The tubular members of housing 2 may comprise an upper head connector 12, through which mechanical and electrical connection is effected between the housing 2 and the cable 4. An inclinometer and azimuth measuring device 13 or comparable means is disposed in housing 2 and coupled to the surface unit 8 through conductors (not shown) within cable 4. The inclinometer and azimuth measuring device 13 is preferably of the type that measures the inclination and the azimuth of the inclination of the housing 2 and supplies related electrical signals. Various types of devices for fulfilling these requirements are known and shown in the prior art. Thus, no description is included in the present application. Also, the azimuthal orientation of the tool in the borehole can be determined by conventional means. One such method is disclosed in a Patent No. 2,427,950 to Doll. Accordingly, the northerly direction is indicated by the arrow in FIGURE 2 wherein line B–C correlates to the line B–C in FIGURE 3.

An acoustic instrumentation section 14 is disposed within housing 2 and contains therein conventional acoustic transmitting and receiving apparatus. The acoustic instrumentation section 14 includes a rotary acoustic scanner 15 containing the rein a transmitting-receiving transducer 16. The rotary acoustic scanner 15 is shown in detail in FIGURE 2. The scanner 15 has a retractable protector nose 17, shown in dotted lines in FIGURE 1, which can be selectively moved forward into protective position or retracted when desired in order to protect scanner. Such apparatus is well known in the art and further comment is deemed unnecessary.

In FIGURES 1 and 2, the transmitting-receiving transducer 16 is shown inclined at an angle to the surface of the borehole 1. The transducer 16 is preferably excited at an ultrasonic frequency and inclined relative to the surface of the borehole wall at a small angle at which substantially all of the acoustic waves from transducer 16 are glancingly reflected from a strip along the wall when the wall surface is substantially smooth.

Transducers having relatively large diameters compared to the wave lengths of the generated waves (such as at least about ½ wave length) are preferred, as for example, piezoelectric crystals. A U.S. patent to Peterson, No. 2,825,044 describes suitable reflectors or focusing means which may be used in carrying out the concepts of this invention. A U.S. patent to Padberg, No. 2,866,512 describes a system for beaming acoustic impulses which may also be used by one skilled in the art.

In operation, the transducer 16 is energized to generate a series of pulsed beams of acoustic waves which are focused to travel along generally radial lines from near the borehole axis to the wall of the borehole. The effective axis of the transducer 16 is rotated around the borehole axis so that successive beamed impulses travel along radial paths having different compass bearings. As shown in the figures, the effective axis of the transducer 16 is maintained at an angle less than 90° relative to the surface of the wall of the borehole.

In a preferred embodiment, a compass means or a compass means and an inclinometer means are mounted within housing 2. These units can comprise measuring devices such as magnetic or gyrocompasses and/or pendulum or liquid level inclinometers associated with means for telemetering the compass bearing and/or inclination of the housing to the surface recording unit. Indications of the bearings and/or inclinations of the housing are transmitted to the recording units along with indications of the relationship between the effective axis of the transmitter and the housing. Thus, as shown in FIGURES 2 and 3, a compass bearing can be assigned to the direction between each beam-swept strip of the borehole wall and the axis of the borehole. As mentioned above, the equipment and procedures for measuring and telemetering such directional relationships of the axis of the transmitter can comprise methods and apparatuses known to those skilled in the art.

After the transducer 16 has generated the beam, it is switched by means well known in the art to a receiving condition to receive the reflected radiation. If the pulsed beam from transducer 16 encounters no irregularity along the borehole wall, no significant amount of acoustic waves will be reflected back to transducer 16. Rather, the pulsed beam will "glance off" and not be reflected back.

The acoustic waves that are reflected back can be received at one or more receiving transducers, substantially adjacent transducer 16, and such receiving transducers can be provided in housing 2 by means well known in the art. The reflected signals are transmitted to the surface recording unit 8 in order that time-histories of the arrivals of reflected waves can be indicated. Conventional mechanical means, or preferably, a motor 18, coupled through slip rings 19 to unit 8, can be used to rotate scanner 15 in order that the transducer 16 may sweep or map a circumferential section of the borehole wall.

In FIGURE 2, one-half rotation of the scanner 15 with the transducer 16 would map one side of the wall of a borehole such as is shown in FIGURE 1. A full circumferential section may be recorded as shown in FIGURE 3. The electrical signals supplied to surface recording unit 8 are reflection-indicating electrical signals which are related to amplitude versus time characteristics of the acoustic waves which encounter discontinuities in the wall surface and are reflected back to substantially the point at which they were produced.

As can be seen in FIGURE 3, the record produced by each pulsed beam from transducer 16 is a recorded line representing the pattern of acoustic reflectors encountered along a narrow strip of the borehole wall. For example, the portion of the borehole wall lying along the line B–C results in the variable amplitude trace which appears to the left of FIGURE 3 or the corresponding variable density trace shown along the line N in FIGURE 3.

The transmission of a pulsed beam from transducer 16 results in an energy pulse or "shot break" at G, then, in the situation shown in FIGURE 2, the first reflected energy arrives from F from the first contact between an acoustic wave front and the nearest portion of the borehole wall. As the wave front progresses from transmitter-receiver transducer 16, its contact with the borehole wall progresses downhole through points B and C. Each contact produces a certain amount of reflected acoustic energy which transducer 16 picks up (in its receiving condition) since such wall surfaces are normally rough and reflect at least some noise energy back to the transducer 16. Obviously, increasing time from the "shot break" at G is a function of increasing distance between the points from which acoustic waves are reflected and the points of acoustic wave transmission and reception.

For recording purposes, the recording unit 8 is actuated at a selected time such as B for the start of the reflection receptions and closed at C when the amplitude of the reflected energy may start to dwindle or become meaningless. A small rotation of the scanner 15 and a repeat of transmission of a pulsed beam from transducer 16 produces another record line to build towards a full map of a circumferential section of the borehole wall. Thus, a closely packed series of recorded lines, each line representing the pattern of the reflectors encountered along a narrow vertical strip of the borehole wall parallel to line B–C in FIGURE 2, is produced as a result of the acoustic energy reflected from the borehole wall from one pulse of transducer 16 in each position of scanner 15.

Since the reflected energy will vary only with the borehole wall surface condition, texture, or shape, minute variations such as crossbedding and sand grain orientation may appear. The ability of the transducer 16 to pick up this information depends on the acoustic frequency used and the elimination of noise by means of sound absorbers and electronic filters or the like means for improving signal-to-noise ratio. The most important borehole wall mapping information may result from the "shadows" or lack of reflected energy as shown by the straight line gaps at H and J in FIGURE 3 indicating where eroded streaks have been encountered along the borehole wall.

The housing 2 is preferably raised in the borehole 1 along the borehole axis at a rate that permits observation of the same wall spot from different vertical angles, for the best feature resolution.

The effective axis of the transmitter 16 is preferably swept around the axis of the borehole at a rate (relative to the rate at which the tool is moved along the axis of the borehole) such that more than one circumferential sweep is completed before the tool has moved along the borehole axis by a distance equalling the length of the longitudinal strips of borehole wall that are swept by the beamed impulses. This causes an anomaly, such as the intersection of the line B–C with the eroded streak H, to be once contacted by acoustic waves when the tool is in a relatively low position, as shown in FIGURE 2, and again when the tool is in a higher position within the well borehole. The waves reflected from the first of such contacts would be received at the time after the impulse production that is indicated by the distance between G and H on FIGURE 3. From the second of such contacts, the waves reflected from the same anomaly would be received at a later time at which the transducer axis has the same compass bearing and the record-marking element for producing the visible record has the same position relative to the record. Thus, by using an oscilloscope on which a display of the first circumferential sweep of the borehole wall is retained and is modified by a display of at least one subsequent sweep, a series of reflections are received from a given reflector from different distances such that the reflection signals add and supplement each other while the noise signals tend to cancel each other. This enhances the signal-to-noise ratio of the recording. Such a record enhancement can be accomplished by means of conventional memory-type oscilloscopes or by repetitively exposing a photographic film by means of procedures and equipment known to those skilled in the art.

Several methods may be used for recording the information received at the surface recording unit 8. One versatile method is a form of direct recording or photographing an oscilloscope screen as discussed in a patent to Peterson, No. 3,093,810. This invention pertains primarily to the method of obtaining electrical signal energy which can be used in many different ways to represent a section of a borehole wall.

I claim as my invention:
1. The method of investigating subterranean formations adjacent a borehole containing a borehole fluid utilizing a borehole tool which comprises the steps of:
    transmitting from said tool at a plurality of closely spaced predetermined positions and at substantially the same known angle to the borehole axis pulsed beams of ultrasonic radiation through said borehole fluid at inclined paths against said adjoining formations;
    detecting at said tool at substantially said predetermined borehole positions and substantially at said known angle ultrasonic radiation reflected from any substantial irregularities of a substantially constant borehole diameter appearing along the adjoining formations;
    recording said reflected radiation;
    moving said borehole tool along the longitudinal axis of the borehole at a rate such that the pulsed beams are transmitted at different angles of incidence to the adjacent formations along the axis of the borehole, thereby permitting observation of the same formations from different angles; and
    forming a visual indication of borehole irregularities from which no ultrasonic radiation is reflected at each closely spaced predetermined position, thereby obtaining a close stacked series of signals, each representing a surface strip of adjacent formations.

References Cited
UNITED STATES PATENTS

| | | | |
|---|---|---|---|
| 2,825,044 | 2/1958 | Peterson | 340—18 |
| 3,369,626 | 2/1968 | ZeManek | 340—18 |

BENJAMIN A. BORCHELT, Primary Examiner

J. FOX, Assistant Examiner